Nov. 15, 1932.  J. B. MALATESTA  1,887,888
MOUTH MIRROR
Filed Jan. 30, 1931
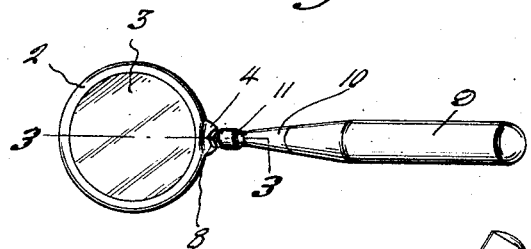
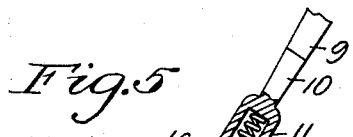
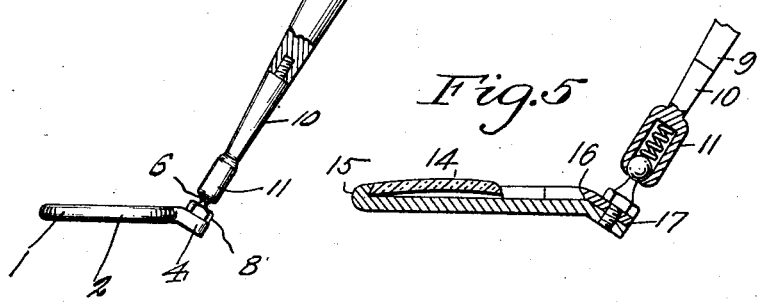
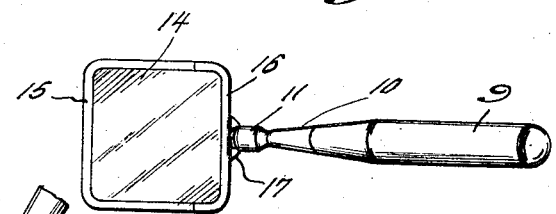
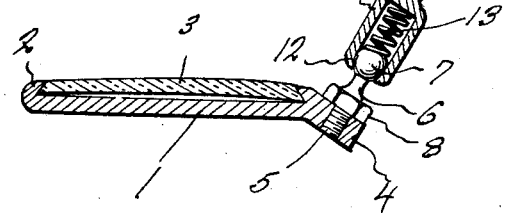
Inventor
J. B. Malatesta
By Clarence A. O'Brien
Attorney Patented Nov. 15, 1932

1,887,888

UNITED STATES PATENT OFFICE

JOHN B. MALATESTA, OF NEW YORK, N. Y.

MOUTH MIRROR

Application filed January 30, 1931. Serial No. 512,421.

This invention relates to new and useful improvements in mouth mirrors, and has for its primary object to provide, in a manner as hereinafter set forth, a device of this character embodying novel means for mounting the mirror on a handle in a manner to permit universal adjustment of said mirror and for frictionally maintaining the mirror in adjusted position, the invention further including novel means for detachably securing the mirror to the handle in a manner to permit removal of said mirror when it is desired to substitute a new mirror therefor, thus permitting the use of the same handle with a plurality of mirrors.

Other objects of the invention are to provide a mouth mirror of the character which will be simple in construction, strong, durable, efficient and reliable in use and which may be manufactured at low cost.

All of the foregoing and still further objects and advantages of the invention may become apparent from a study of the following specification, taken in connection with the accompanying drawing wherein like characters of reference designate corresponding parts throughout the several views, and wherein:—

Figure 1 is a view in top plan of a mirror in accordance with this invention.

Figure 2 is a view principally in side elevation and partially in section of the mirror.

Figure 3 is a fragmentary detail on an enlarged scale and in vertical section taken substantially on the line 3—3 of Figure 1.

Figure 4 is a view showing a slightly modified form of the invention wherein the mirror is of polygonal form.

Fig. 5 is a sectional view thru Fig. 4.

Referring to the drawing in detail, it will be seen that the reference numeral 1 designates a flat, metallic disk or plate having an integral, upstanding flange 2 on its marginal portion the inner side of which is beveled in a manner to retain a mirror 3. An ear 4 is formed integrally on the periphery of the disk or plate 1 and the flange 2 and projects at an obtuse angle therefrom and is provided with a threaded aperture for the reception of the threaded shank 5 which is formed on one end of a metallic stem 6 having a ball head 7 formed integrally with its other end. The stem 6 is further provided with a polygonal flange 8 for abutting engagement with the ear 4 and which provides means for obtaining a grip on the stem 6 for threading the shank 5 into or out of the ear 4, as will be obvious.

A handle is designated by the reference numeral 9 and has threadedly connected to one end an extension 10 having a head 11 on one end provided with an elongated socket for the reception of the ball 7 in the manner illustrated to advantage in Figure 3 of the drawing. The free end of the head 11 has formed thereon an inturned flange 12 for retaining the ball in the socket and a coil spring 13 is disposed longitudinally in the socket and has one end engaged with the inner end wall of the socket and its other end engaged with the ball 7 in a manner to yieldingly urge said ball against the inturned flange 12. The wall of the flange 12 is, of course, curved to conform to the ball 7.

In the modified form of the invention illustrated in Figure 4 of the drawing, the mirror supporting plate is of polygonal form as is also the mirror 14. This form of the invention further includes a fixed mirror supporting flange 15 which is formed integrally with the supporting plate and a removable flange portion 16 having an apertured ear 17 formed integrally therewith which is disposed over the apertured ear on the supporting plate. In this form of the invention the stem 6 has its threaded shank 5 disposed through the aperture in the ear 17 and threaded into the ear on the mirror supporting plate.

It will thus be seen that the stem 6 constitutes means for rigidly but detachably securing the flange portion 16 in position. When the stem 6 is detached in the form of the invention illustrated in Figure 4, the flange portion 16 may be removed and thereafter the mirror 14 may be removed by sliding the same out of the flange 15 when it is desired to renew the mirror, thus permitting the entire device with the exception of the mirror to be used again. In all other respects the mirror illustrated in Figure 4 is identical with that illustrated in Figures 1 to 3, inclusive.

It is believed that the many advantages of a mouth mirror in accordance with this invention will be readily understood, and although the preferred embodiments of the invention are as illustrated and described, it is to be understood that changes in the details of construction may be had which will fall within the scope of the invention as claimed.

What is claimed is:—

1. A mirror of the character described comprising a polygonal plate, a mirror disposed on the plate, a flange formed integrally on a portion of the marginal portion of the plate and operatively engaged with the mirror for retaining said mirror on the plate, an apertured ear formed integrally on a marginal edge of the plate which is free of the flange, a flange removably mounted on that portion of the plate which is free of the first named flange and engaged with the mirror and having its ends engaged with the ends of the first named flange, an apertured ear formed integrally on the removable flange and disposed in abutting engagement with the first named ear, a stem extending through the second named ear and threaded into the first named ear for clamping said ears together and securing the second named flange in position, and a handle connected to the stem.

2. A mirror of the character described comprising a polygonal plate, a mirror disposed on the plate, a flange formed integrally on a portion of the marginal portion of the plate and operatively engaged with the mirror for retaining said mirror on the plate, an apertured ear formed integrally on a marginal edge of the plate which is free of the flange, a flange removably mounted on that portion of the plate which is free of the first named flange and engaged with the mirror and having its ends engaged with the ends of the first named flange, an apertured ear formed integrally on the removable flange and disposed in abutting engagement with the first named ear, a stem extending through the second named ear and threaded into the first named ear for clamping said ears together, and securing the second named flange in that position, a handle and a spring pressed ball and socket connection between the handle and the stem.

In testimony whereof I affix my signature.

JOHN B. MALATESTA.